(12) United States Patent
Tingley (10) Patent No.: US 6,565,959 B1
(45) Date of Patent: May 20, 2003

(54) USE OF SYNTHETIC FIBERS IN A GLUELINE TO INCREASE RESISTANCE TO SAG IN WOOD AND WOOD COMPOSITE STRUCTURES

(76) Inventor: Daniel A. Tingley, 3310 SW. Willamette, Corvallis, OR (US) 99733

( * ) Notice: Subject to any disclaimer, the term of this patent is extended or adjusted under 35 U.S.C. 154(b) by 0 days.

(21) Appl. No.: 09/067,357

(22) Filed: Apr. 27, 1998

Related U.S. Application Data (63) Continuation-in-part of application No. 08/614,853, filed on Mar. 12, 1996, now Pat. No. 5,744,228, which is a continuation-in-part of application No. 08/596,420, filed on Feb. 2, 1996, now abandoned, which is a continuation of application No. 08/439,155, filed on May 11, 1995, now abandoned, which is a continuation of application No. 08/205,714, filed on Mar. 4, 1994, now abandoned.

(51) Int. Cl.$^7$ .................................................. D21J 1/16
(52) U.S. Cl. ................. 428/292.4; 428/902; 428/537.1; 428/105; 428/113; 428/300.7
(58) Field of Search ................................ 428/292.4, 902, 428/537.1, 113, 105, 300.7

(56) References Cited

U.S. PATENT DOCUMENTS

| | | | | |
|---|---|---|---|---|
| 2,927,623 A | | 3/1960 | Huisman et al. ............. 154/1.7 |
| 3,755,067 A | | 8/1973 | Schnabel .................... 161/262 |
| 4,097,648 A | * | 6/1978 | Pringle ..................... 428/537.1 |
| 4,228,631 A | | 10/1980 | Geffe .......................... 52/690 |
| 4,444,823 A | | 4/1984 | Gagliani ..................... 428/113 |
| 4,500,589 A | | 2/1985 | Schijve et al. .............. 428/213 |
| 4,569,873 A | | 2/1986 | Robbins ...................... 428/106 |
| 5,273,819 A | * | 12/1993 | Jex ............................ 428/408 |
| 5,496,648 A | * | 3/1996 | Held ........................... 428/511 |
| 5,716,697 A | * | 2/1998 | Meeker ....................... 428/215 |
| 5,738,935 A | * | 4/1998 | Turk et al. ................ 428/304.4 |

FOREIGN PATENT DOCUMENTS

| | | | | |
|---|---|---|---|---|
| AU | 34345 | 3/1978 | ........... B32B/21/08 |
| DE | 3437798 | 4/1986 | .................. 156/276 |
| EP | 0013146 | 1/1982 | ........... B32B/15/08 |
| JP | 20312 | 9/1972 | .................. 156/276 |

* cited by examiner

Primary Examiner—Elizabeth M. Cole
(74) Attorney, Agent, or Firm—Stoel Rives LLP (57) ABSTRACT

A high strength, high modulus fiber is applied to uncured adhesive in the glueline of a laminar wood beam as an anti-sag agent and for improved shear strength, creep resistance, and gapability. In one embodiment, discontinuous fibers are evenly applied over the adhesive at approximately 0.25 to 1.35 wt % fiber. The applied fibers are chopped fibers of aramid, carbon, glass, or other high strength, high modulus fiber and are applied in lengths of approximately 0.025 to 2.54 centimeters. In another embodiment, discontinuous fibers are used as an additive to a resin matrix for reconstituted fiber products to control dimensional change. In a third embodiment, continuous fibers are used in the glueline in a pretensioned or an untensioned way to improve shear resistance, creep resistance, and strength.

10 Claims, 7 Drawing Sheets

USE OF SYNTHETIC FIBERS IN A GLUELINE TO INCREASE RESISTANCE TO SAG IN WOOD AND WOOD COMPOSITE STRUCTURES

RELATED APPLICATIONS

This is a continuation-in-part of application Ser. No. 08/614,853, filed Mar. 12, 1996, now U.S. Pat. No. 5,744,228, which is a continuation-in-part of application Ser. No. 08/596,420, filed Feb. 2, 1996, abandoned which is a continuation of application Ser. No. 08/439,155, filed May 11, 1995, abandoned, which is a continuation of application Ser. No. 08/205,714, filed Mar. 4, 1994, abandoned.

TECHNICAL FIELD

This invention pertains to the use of synthetic fibers in an interlaminar adhesive layer of a laminar wood beam, and more particularly to the use of discontinuous aramid fibers in the interlaminar adhesive layer of a laminar wood beam to improve interlaminar shear strength and to reduce creep. The invention also pertains to the use of discontinuous fibers in the adhesive or resin matrix in wood composites to enhance dimensional stability and creep resistance and the use of continuous fibers in gluelines of wood and wood composite beam structures to enhance beam creep resistance and increase strength and stiffness characteristics.

BACKGROUND OF THE INVENTION

Figure 1:
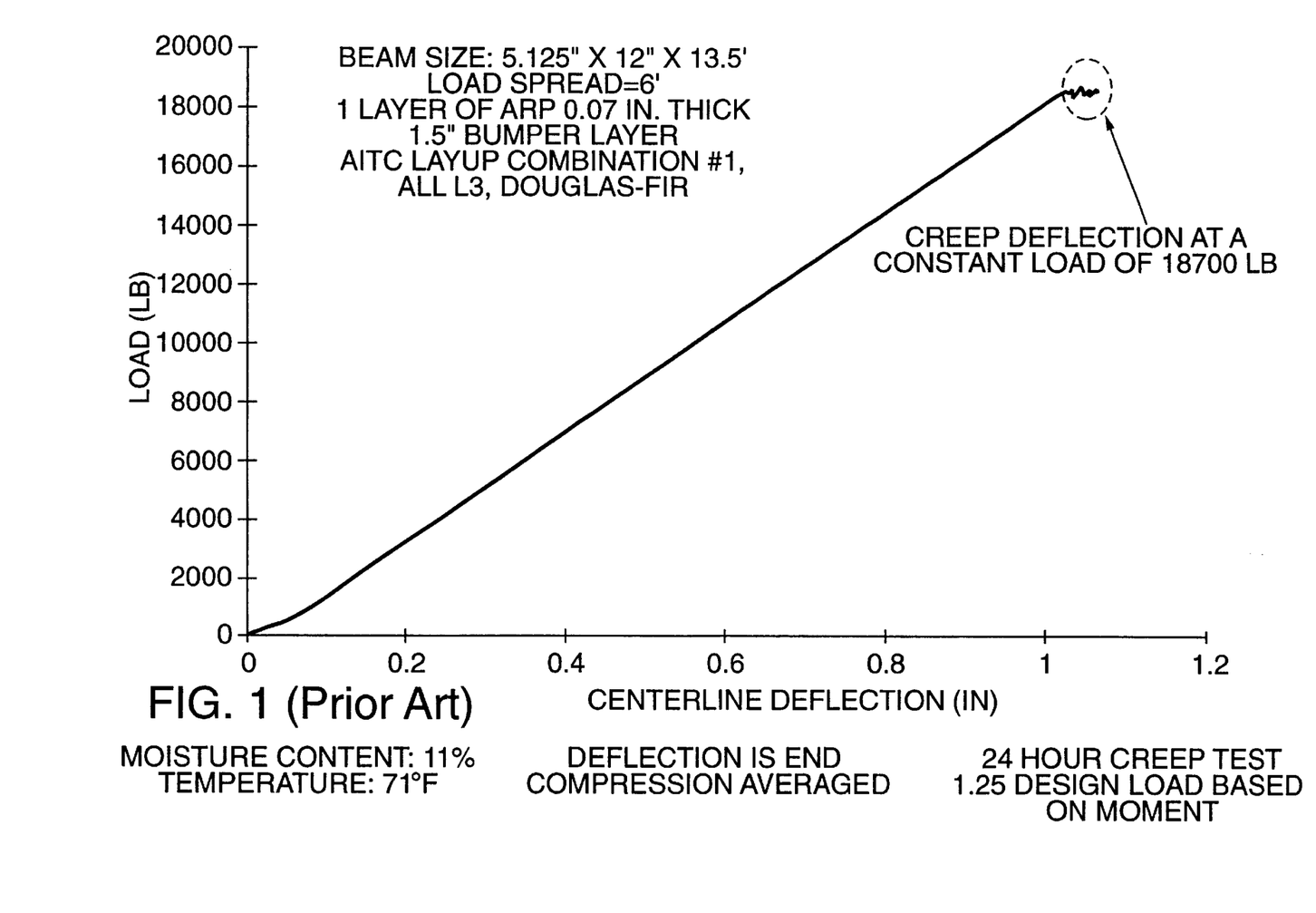
FIG. 1 is a diagram of load versus deflection showing creep in a reinforced gluelam beam of a type similar to that shown in FIG. 3 but without the use of synthetic fibers in the glueline.

Wood and wood composite structural products (WWC) such as I-beams, glued laminated wood beams ("glulams"), laminated veneer lumber (LVL), parallel strand lumber, Parallam® laminate, medium and high density fiber board, particle board, oriented strand board, flake board, and solid sawn lumber are used in a wide variety of applications from furniture to bridge girders. When placed into service, WWCs can span distances of up to 500 feet and support loads of many tons. The beams are subjected to tension, compression, and shear stress. When a laminated beam is loaded, the load causes tensile forces in some laminae and compressive forces in other laminae. For example, in a simple loading of a laminated beam with a uniform load, the lower laminae are subjected to a tensile load between support points, and the upper laminae are subjected to a compressive load between support points. This loading of the beam causes stress in the interlaminar layers of adhesive which, over time, causes creep. Creep is defined as slow, plastic deformation (inelastic or permanent deformation) under a constant load. Creep causes a vertical displacement of the beam, which displacement is referred to as sag. FIG. 1 is a load versus deflection diagram that shows creep in a reinforced glulam beam. FIG. 1 presents the results of a 24-hour creep test of a 5.125"×12"×13.5' beam across a 13.5-foot span and a six-foot spread between two equal load heads.

Although a cured interlaminar layer of adhesive may be quite rigid, sustained loading of a WWC over time causes creep in the layers of adhesive between laminae or in the resin fiber composite and thereby causes the beam to sag under its load. This is an undesirable property, and beam designers try to prevent sag by such measures as over-designing the beam and adding anti-sag agents to the adhesive. Over-designing the beam is an expensive solution to the creep problem. Typically, anti-sag agents are added to the adhesive.

A typical anti-sag additive for adhesives in the wood beam industry is cellulose, which is commonly used in a granular form known as wood flour. Cellulose is added to the adhesive used between laminae to improve the shear strength of the adhesive. The shear strength of the adhesive is thus related to the interlaminar shear strength of the beam.

Any additive to an interlaminar adhesive will ideally interfere with neither the application of the adhesive nor the future use or processing of the laminate. The use of fibers as an additive to the adhesive has not been effective because the fibers interfere with the applicators used to apply the adhesive to a lamina of wood. Thus, the use of anti-sag agents in the wood industry has been confined to adhesive additives such as cellulose that do not interfere with the adhesive applicators. However, because of the increasing scarcity of wood as a resource and the related demand for higher performance wood beam structures, a more suitable solution to the problem of creep in the adhesive layer of a wood laminate is required.

Gagliani, et al. U.S. Pat. No. 4,444,823 discloses the use of an adhesive-soaked fiber mat or tow as filler and reinforcing additive in a modified polyimide adhesive. The adhesive is used to bond metal to metal, glass to glass, or ceramics to ceramics.

Schnabel U.S. Pat. No. 3,755,067 discloses the use of processed asbestos fibers to improve viscosity and thixotropic properties of a phenolic wood laminating adhesive resin.

Schijve, et al. U.S. Pat. No. 4,500,589 discloses the use of yarns of endless filaments of poly(paraphenylene terephthalamide) arranged to lie in a straight line within a resin matrix between metal sheets to create a strong composite article.

Woodbrey, et al. European Patent No. 00 013 146 discloses the fabrication of a composite article having thin aluminum layers over a relatively thick thermoplastic matrix and teaches modification of the thermoplastic matrix with various short, discontinuous fibers.

Miwa Japanese Patent No. 47(1972)-20312 discloses the use of discontinuous chopped fibers in the glueline between wood laminates to increase wood resistance to dimensional change, thereby reducing cracks in the surface of composite laminate caused by wood shrinkage stresses. The resultant composite described by Miwa does not support structural loads.

Litwin German Patent No. 3437798A1 describes the use of discontinuous fibers in the glue to achieve shear resistance in the glueline between concrete slabs. The composite does not act as a bearing component for loads across a span.

Huisman U.S. Pat. No. 2,927,623 describes a method of producing a panel in which discontinuous fibers are placed in a plastic matrix and used to form a sheet that has increased toughness and strength. The fibers are not used in gluelines as a creep or strength enhancement agent for a wood structural product.

Krys Australian Patent No. 34345178 describes a method of using discontinuous fibers in an aldehyde resin adhesive for use in manufacturing plywood to achieve higher strength and toughness. The fibers are introduced in adhesive paper to plywood and are not used as shear enhancement or as a creep reducing agent.

None of these patents discloses the use of discontinuous fibers for shear enhancement in the glueline or creep resistance in the composite structural member. Moreover, none of these patents discusses the use of continuous fibers of various lengths in the glueline for increased strength, creep resistance, and shear performance of the glueline.

SUMMARY OF THE INVENTION

One embodiment of the present invention solves the problems described above by the use of discontinuous aramid fibers in the adhesive layer of laminar wood beams. It has been found that adding aramid fibers to the adhesive layer between laminae improves the shear strength of the adhesive, reduces creep of the adhesive, and thus reduces sag of the wood beam. This embodiment of the present invention comprises the use of discontinuous aramid fibers having lengths of up to about 3 cm added to a layer of adhesive that has been applied to a laminae of wood. A second lamina of wood is then placed over the adhesive layer, and pressure is applied to adhere together the two laminae. The fiber material in the adhesive increases its gap filling properties in the interface between the two laminae.

Another embodiment of the invention is the use of discontinuous fiber material as an additive to a resin matrix for reconstituted fiber products to control dimensional change.

A third embodiment of the invention entails the use of continuous fibers in the glueline of the beam to improve its shear resistance, creep resistance, strength and stiffness characteristics.

The foregoing and other objectives, features, and advantages of the invention will be more readily understood upon consideration of the following detailed description of preferred embodiments of the invention, taken in conjunction with the accompanying drawings.

DETAILED DESCRIPTION OF PREFERRED EMBODIMENTS

Figures 2, 3:
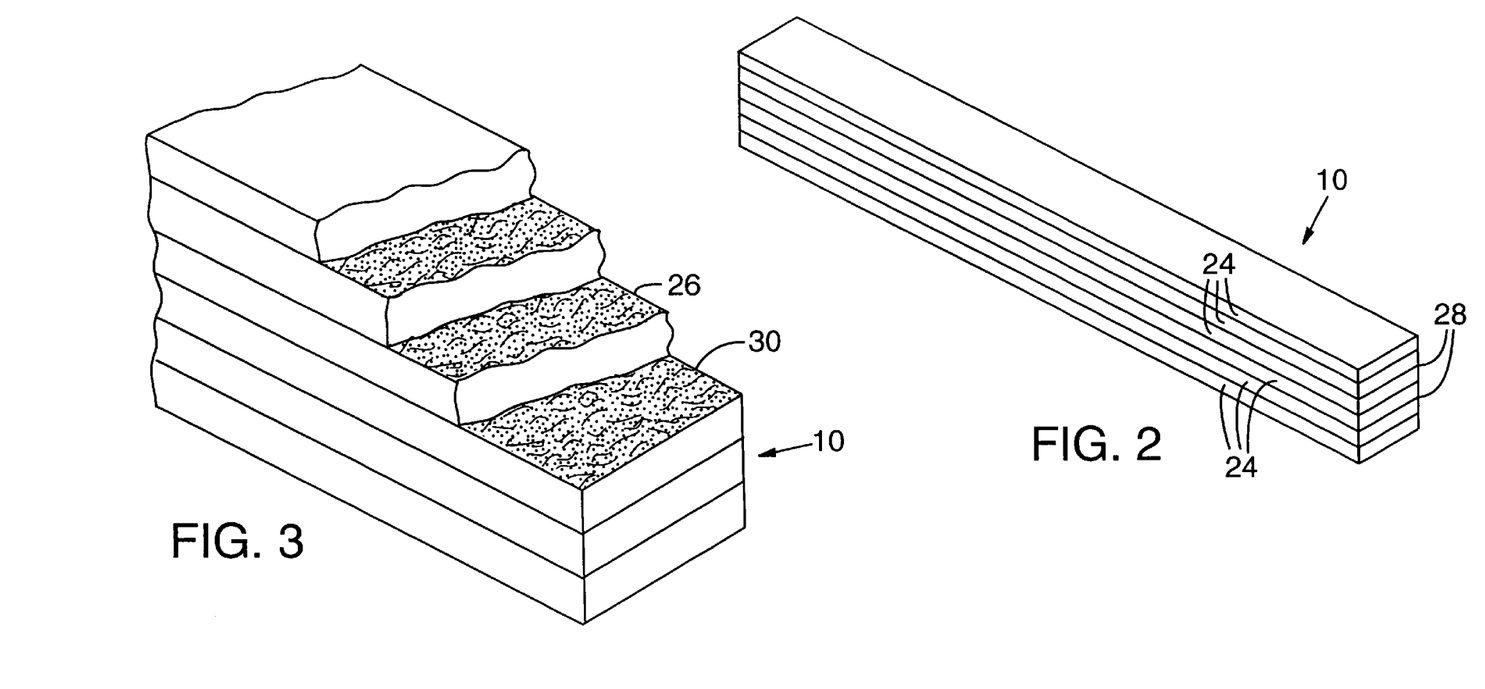
FIG. 2 is a perspective view of a laminar wood beam of the present invention.
FIG. 3 is an enlarged, fragmentary perspective view of a wood beam of the present invention having the upper laminae partly removed to show features of the invention.

Referring generally to FIGS. 2 and 3, a laminar beam 10 of the present invention comprises a plurality of laminae 24 of elongate planar wood boards or planks that have been joined together by an adhesive 26. Although only six laminae 24 are shown, skilled persons will understand that laminar wood beam 10 could comprise fewer or many more laminae of wood. Furthermore, in most embodiments of laminar wood beams, a single plank would not extend the entire length of the beam but would abut the end of another plank. A glueline 28 defines the region between laminae of wood where adhesive 26 is applied. With respect to a first embodiment, within the glueline 28 there is a plurality of short, discontinuous fibers 30 that are randomly arranged in adhesive 26. As shown in FIG. 3, fibers 30 are applied to each glueline 28. Glueline 28 preferably has an approximate thickness of about 9.05 to 0.1 mm (0.002 to 0.004 inch).

A beam is fabricated according to the present invention by the following steps. A layer of adhesive is applied to a surface of a first wood lamina. After application of the adhesive, chopped fibers 30 are added to the adhesive layer such as by sprinkling the fibers over the adhesive. To date, good results have been obtained by applying the fibers by hand, but it is contemplated that during full scale production the fibers would be applied by a specially devised machine. Ideally, the fibers are applied at a uniform density along the length and width of the beam. Preferably, the fibers are added at a weight ratio of fiber-to-adhesive between about 0.25% and 1.5%, and is no greater than about 5%. The fibers are 0.0254 to 2.54 cm (0.010 to 1.000 inch) long, and in a preferred embodiment of the present invention, are 3 to 5 mm long.

One preferred embodiment of the invention uses aramid fibers of a poly (paraphenylene terephthalamide) (PPTA) polymer available under the trade name "TWARON" from AKZO Fibers, Inc. of Conyers, Ga. Alternative embodiments of the invention could use other fibers such as glass, carbon, or any other suitable high strength, high modulus fiber. In addition, it is envisioned that alternative embodiments of the invention may use different fibers in different gluelines. For example, carbon fibers may be used in the gluelines that will be subject to the greatest compressive forces, and aramid fibers may be used in those gluelines that receive the greatest tensile forces.

After the fibers have been applied to the adhesive, a second wood lamina is placed on top of the adhesive. The process is repeated until the desired number of laminae 24 are in place. The beam can be left for 40 to 115 minutes open assembly time before the beam is removed and loaded into a press, and the press is closed. The beam is subjected to a minimum of eight hours at full pressure of 125 to 200 psi, after which the pressure is relieved.

Alternatively, the aramid can be added to the adhesive in the form of a PPTA polymer, herein referred to as a microfibril. The PPTA microfibril has a length of about 50 to 600 microns. A preferred microfibril length is about 50 to 300 microns, and an average microfibril length of 75 microns is presently most preferred.

It is noted that the microfibril form of the aramid and the aramid fibers of length 3 to 5 mm can be also added to the adhesive prior to applying the adhesive with standard applicators. When the aramid is added to the adhesive prior to application, it has been found that the adhesive has excellent gap filling properties in which elements of the fiber material in the adhesive bond line extend into gaps in the major surfaces of the first and second wood laminae by contacting but not extending substantially into either one of the first and second wood laminae.

The present invention has been found suitable for use with all adhesives currently in use in fabricating wood beams, including, but not limited to epoxies, polyesters, melamines, urea resins, and phenolic resins such as phenol-formaldehyde resins. A preferred adhesive is a phenol-resorcinol-formaldehyde resin system such as that sold by Borden Chemicals of Columbus, Ohio as LT 75 with hardener FM 260.

Figures 4, 5A, 5B:
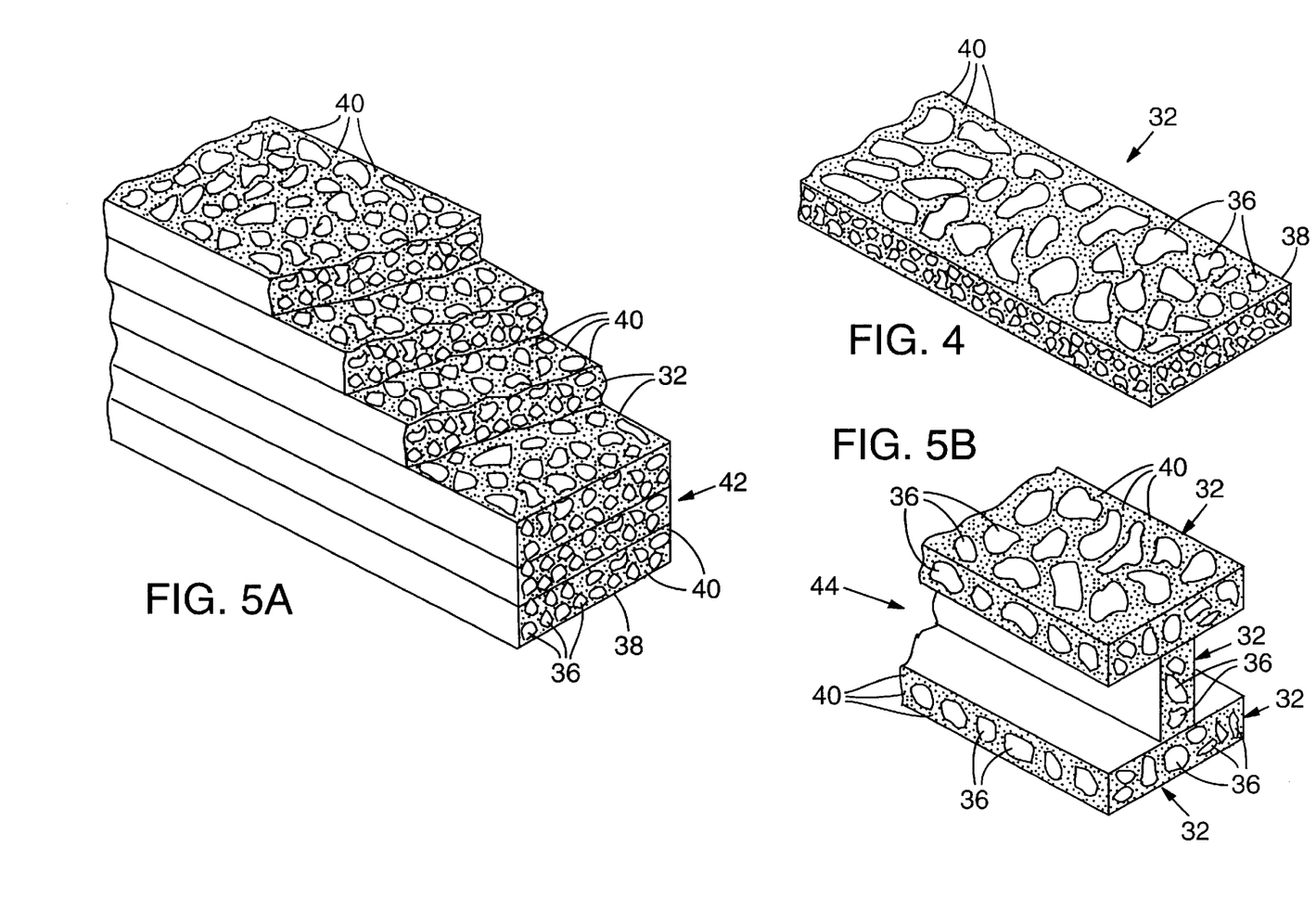
FIG. 4 is a perspective view of a reconstituted wood fiber board of the present invention.
FIG. 5A is an enlarged, fragmentary perspective view of a reconstituted wood fiber beam of the present invention having the upper laminae removed to show features of the invention
FIG. 5B is an enlarged, fragmentary perspective view of a reconstituted wood I-beam of the present invention.

The invention also contemplates the use of fiber material as an additive to a resin matrix for reconstituted fiber products to control dimensional change. The products are manufactured using wood particles, chips, flakes, and wafers held in a resin matrix. Referring to FIG. 4 a reconstituted wood board 32 is shown to be made from reconstituted wood particles 36 held together by a resin binder 38 having short, discontinuous fibers 40 randomly mixed throughout the resin. The fibers 40 are, preferably, high strength, high modulus fiber material similar to the fibers 30 of FIGS. 2 and 3. The fibers 40 may be aramid fibers of a poly (paraphenylene terephthalamide) (PPTA) polymer or other fibers such as glass, carbon, or any other suitable high strength, high modulus fiber. These fibers are typically 0.0254 to 2.54 cm (0.010 to 1.000 inch) long and are preferably 3 to 5 mm long. Alternatively, the fibers 40 may be in the form of a PPTA polymer having a length of about 50 to 600 microns. A preferred range is between about 50 to 300 microns with an average microfibril length of about 75 microns being preferred. FIG. 5A shows a laminated wood beam 42 comprising a plurality of reconstituted wood boards 32 that have been joined together by an adhesive. If desired, the additional fibers 40 may be sprinkled into the glueline as described above with reference to the laminar beam 10 in FIG. 3. FIG. 5B shows a wood I-beam 44 comprising reconstituted wood boards 32.

As seen in FIGS. 4, 5A, and 5B, the wood particles 36 are shown as wood chips. It should be noted that these wood chips are shown spaced in an exaggerated manner for a clearer illustration of the wood particles 36, resin 38 and high strength, high modulus fibers 40. However, the wood particles may be in the form of saw dust, wood shavings, woodworking or agricultural waste, and noncommercial or low grade/value wood species.

The reconstituted wood particle board may be made by various processes. One example includes pouring a slurry consisting of wood particles, water, and discontinuous high strength, high modulus fibers onto a continuously moving screen. The water is drained off leaving a wet wood particle mat on the screen. The interlaced wood particle mat is then oven dried producing a continuous sheet of fiberboard. Hot steam jets can be used to increase the density of the material to produce wet-process hardboard. This process may be used to produce hardboard, fiberboards, and low, medium and high density fiberboard.

Another method includes mixing sawdust, wood shavings, wood waste or veneer with an adhesive containing the discontinuous fibers and compressing the mixture under heated platens. Different profiles of wood material can be used through the depth. For example, saw dust or small wood waste materials can be placed between wood wafers and pressed under heat. Organizing the layup through the thickness allows for increased engineering properties including strength and stiffness. Molds can be used to produce complex shapes. Plywood, oriented strandboard, waferboard, particleboard, medium and high density fiberboard, and laminated veneer lumber may be made by this process.

Yet another method for manufacturing such a reconstituted wood structural member includes the combining of wood particles, strands, or veneers with a binder mixed with the discontinuous fibers and forcing the combination through a die under heat and pressure to produce a continuous board. The finished board can be cut to particular lengths and it can intricate profiles determined by the cross section of the die. This process may be used to produce parallel strand lumber, Parallam®, particle board, variations of laminated veneered lumber.

The reconstituted wood product may also be made by combining wood chips or other type of wood waste with a wax or other type of binder with the discontinuous fibers and subjecting the combination to heat and pressure on the hot press. This dried processed board is similar to the wet processed board except that the mechanical properties are not as great due to the decreased fiber interlocking. Hardboard; high density hardboard; fiberboard; and low, medium, and high density fiberboard may be made from this process.

These reconstituted wood boards can then be laminated to form the beam 42 in FIG. 5A or connected to form the I-beam 44 in FIG. 5B.

EXAMPLE 1

A specimen of Douglas fir was prepared for a standard block shear test with LT 75 with hardener FM 260 adhesive applied at a spread rate of 74 lbs/1,000 ft$^2$. "TWARON" 1056 fibers of length 3 to 5 mm were added to the adhesive at approximately 0.25 wt % fiber/adhesive. The measured ambient air temperature was 63°, and the relative humidity was 42%. The lumber temperature was 60° F., and the adhesive temperature was 58° F. The moisture content of the wood was 12% or below. The specimen was subjected to a minimum full pressure close time of eight hours at 130 psi. The specimen was tested to failure according to the American Institute of Timber Construction (AITC) Test T107 shear test. The results are presented in Table 1.

According to industry standards, the required average shear strength of adhesive joints in laminated construction of Douglas fir at 12% moisture content or below is 1130 psi, and at 14% moisture content the required shear strength is 1080 psi.

TABLE 1

| Example | Average Shear Strength psi | Average % Wood Failure | Number of Measurements |
| --- | --- | --- | --- |
| 1 | 1695 | 95 | 16 |
| 2 | 1520 | 97 | 16 |
| 3 | 1254 | 93 | 16 |
| 4 | 1224 | 90 | 16 |
| 5 | 1769 | 94 | 16 |
| 6 | 1314 | 99 | 8 |
| 7 | 1487 | 99 | 8 |
| 8 | 1473 | 96 | 8 |

EXAMPLE 2

The procedure of Example 1 was followed except that the fibers were added to the adhesive at approximately 0.50 wt % fiber/adhesive. The specimen was tested to failure according to the AITC Test T107 shear block test. The results are presented in Table 1.

EXAMPLE 3

A specimen of Douglas fir was prepared for a standard block shear test with LT 75 with hardener FM 260 adhesive applied at a spread rate of 72 lbs/1,000 ft$^2$. "TWARON"

1056 fibers of length 3 to 5 mm were added to the adhesive at approximately 0.75 wt % fiber/adhesive. The measured ambient air temperature was 61° F., and the relative humidity was 43%. The lumber temperature was 59° F., and the adhesive temperature was 58° F. The moisture content of the wood was 14% or below. The specimen was subjected to a minimum full pressure close time of eight hours at 130 psi. The specimen was tested to failure according to the AITC Test T107 standard shear block test. The results are presented in Table 1.

EXAMPLE 4

The procedure of Example 3 was followed except that the fibers were added to the adhesive at approximately 1.0 wt % fiber/adhesive. The specimen was tested to failure according to the AITC Test T107 shear block test. The results are presented in Table 1.

EXAMPLE 5

The procedure of Example 3 was followed except that the fibers were added to the adhesive at approximately 5.0 wt % fiber/adhesive. The specimen was tested to failure according to the AITC Test T107 shear block test. The results are presented in Table 1.

EXAMPLE 6

A specimen of Douglas fir was prepared for a standard block shear test with LT 75 with hardener FM 260 adhesive applied at a spread rate of 74 lbs/1,000 ft$^2$. PPTA microfibril with an average length of 75 microns was added to the adhesive at approximately 0.25 wt % microfibril/adhesive. The room air temperature was 64° F., and the relative humidity was 42%. The lumber temperature was 61° F., and the adhesive temperature was 58° F. The moisture content of the wood was below 12%. The specimen was subjected to a minimum full pressure close time of eight hours at 130 psi. The specimen was tested to failure according to the AITC Test T107 shear block test. The results are presented in Table 1.

EXAMPLE 7

The procedure of Example 6 was followed except that the PPTA microfibril was added to the adhesive at approximately 0.75 wt % microfibril/adhesive. The specimen was tested to failure according to the AITC Test T107 shear block test. The results are presented in Table 1.

EXAMPLE 8

The procedure of Example 6 was followed except that the PPTA microfibril was added to the adhesive at approximately 5.0 wt % microfibril/adhesive. The specimen was tested to failure according to the AITC Test T107 shear block test. The results are presented in Table 1.

Figure 6:
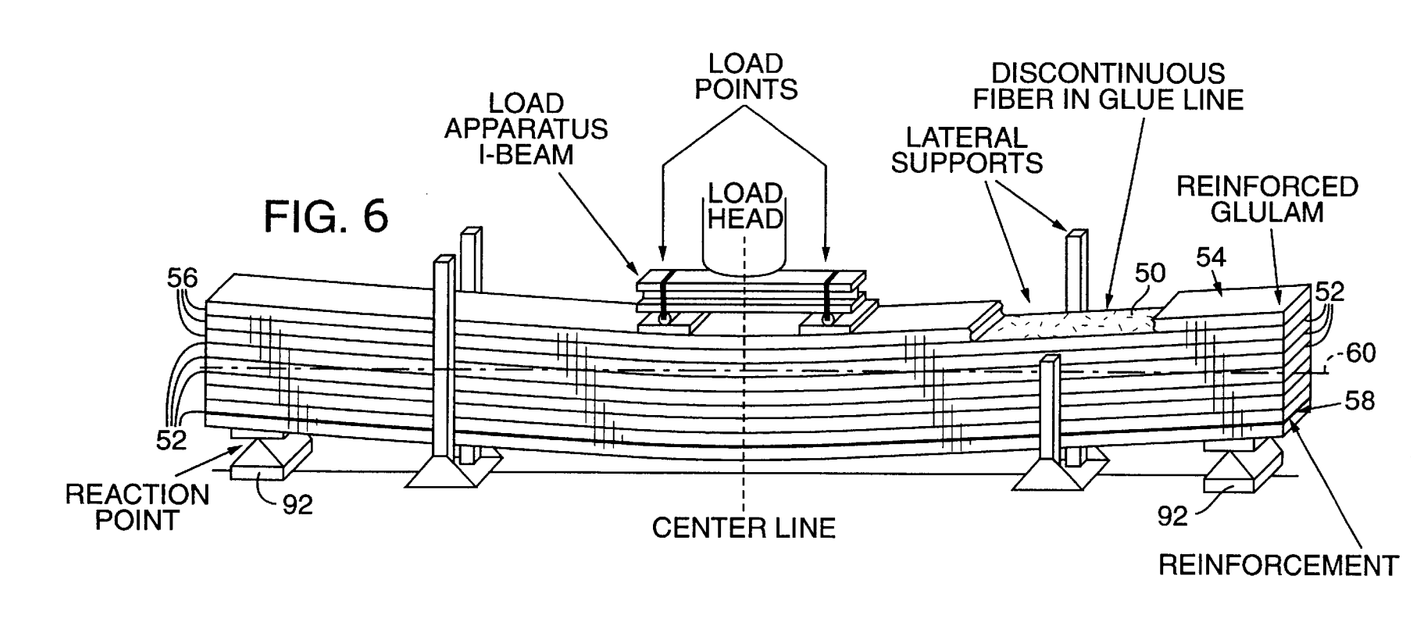
FIG. 6 is an enlarged, perspective view of a wood beam of the present invention (under a loaded condition) having the uppermost lamina partly removed to show discontinuous fiber in the glueline.

As shown in Table 1, the interlaminar adhesive layers of the present invention demonstrate improved shear strength with wood failure well above the minimum 80% required for wet-use and dry-use adhesives. FIG. 6 has a broken away portion that shows the use of discontinuous fibers 50 in a glueline 52 of a beam 54 composed of nine elongate laminae 56 and a high-strength fiber-reinforced plastic panel 58 positioned between the lowest and next lowest ones of laminae 56. Laminae 56 and panel 58 extend along a longitudinal beam axis 60. Beam 54 represents the type of wood and wood structural component for which the invention is advantageous.

Figure 7:
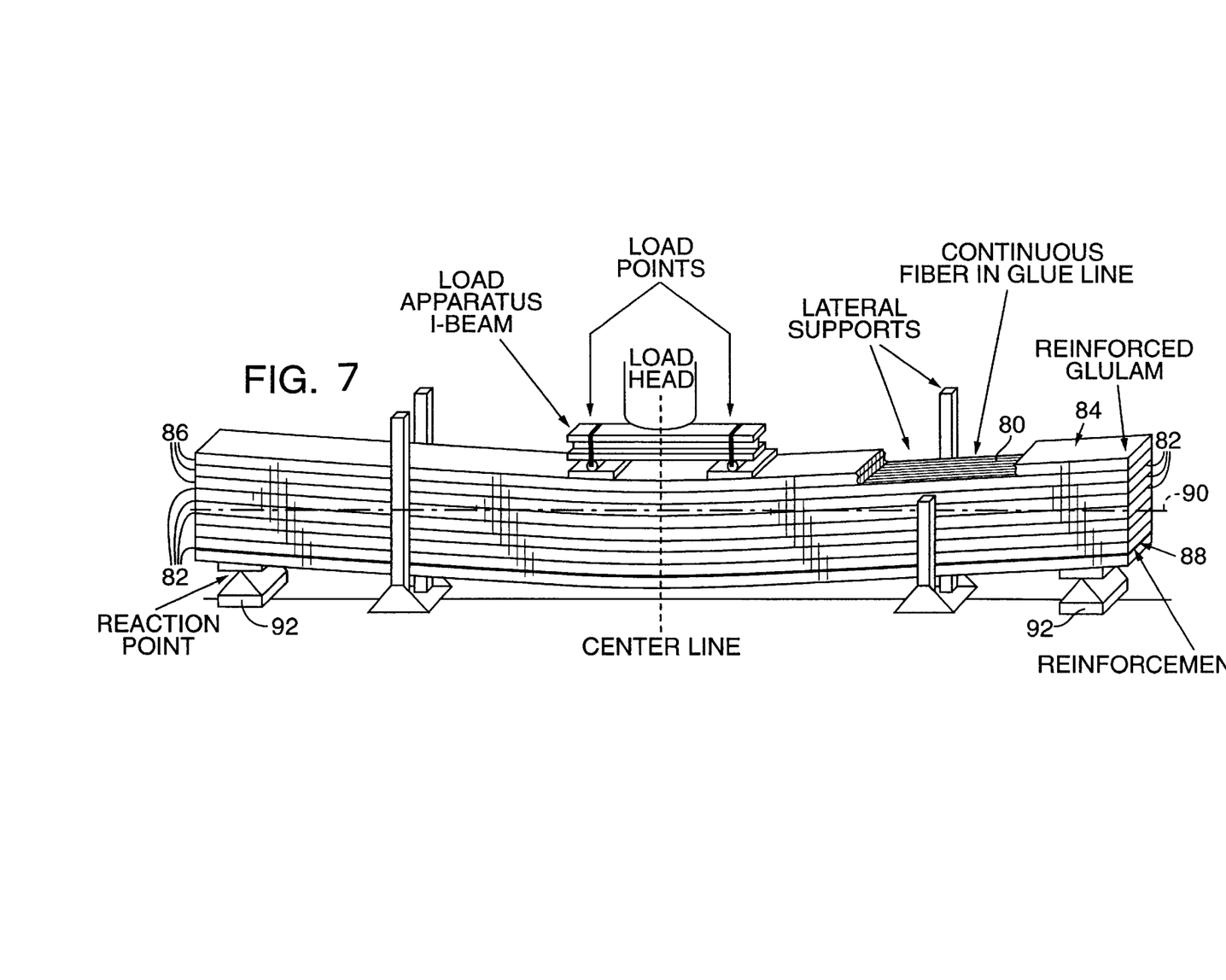
FIG. 7 is an enlarged, perspective view of a wood beam of the present invention (under a loaded condition) having the uppermost lamina partly removed to show continuous fiber in the glueline.

With respect to an alternative embodiment, FIG. 7 has a broken away portion that shows the use of continuous fibers 80 in a glueline 82 of wood and wood composite structural products. In particular, FIG. 7 shows a beam 84 composed of nine elongate laminae 86 and a high-strength fiber-reinforced plastic panel 88 positioned between the lowest and next lowest ones of laminae 86. Laminae 86 and panel 88 extend along a longitudinal beam axis 90. Fibers 80 can be either pretensioned 100% aligned along longitudinal beam axis 90 or positioned in a generally longitudinal fashion in the glueline of a wood or wood composite structural product. A variety of fibers 80 such as aramid, carbon, fiberglass, and high performance polyethylene can be used. Fibers 80 can be of either partial or full length relative to the length of beam 54 and can be introduced into glueline 82 in a manner analogous to that described in U.S. Pat. No. 5,362,545 for pultruding fibers to form a reinforcement panel.

FIGS. 6 and 7 show the deflection of the respective beams 54 and 84 supported between foundations 92 and thereby show the operation of beams 54 and 84 when they form parts of a bridge or other support structure.

Figure 8:
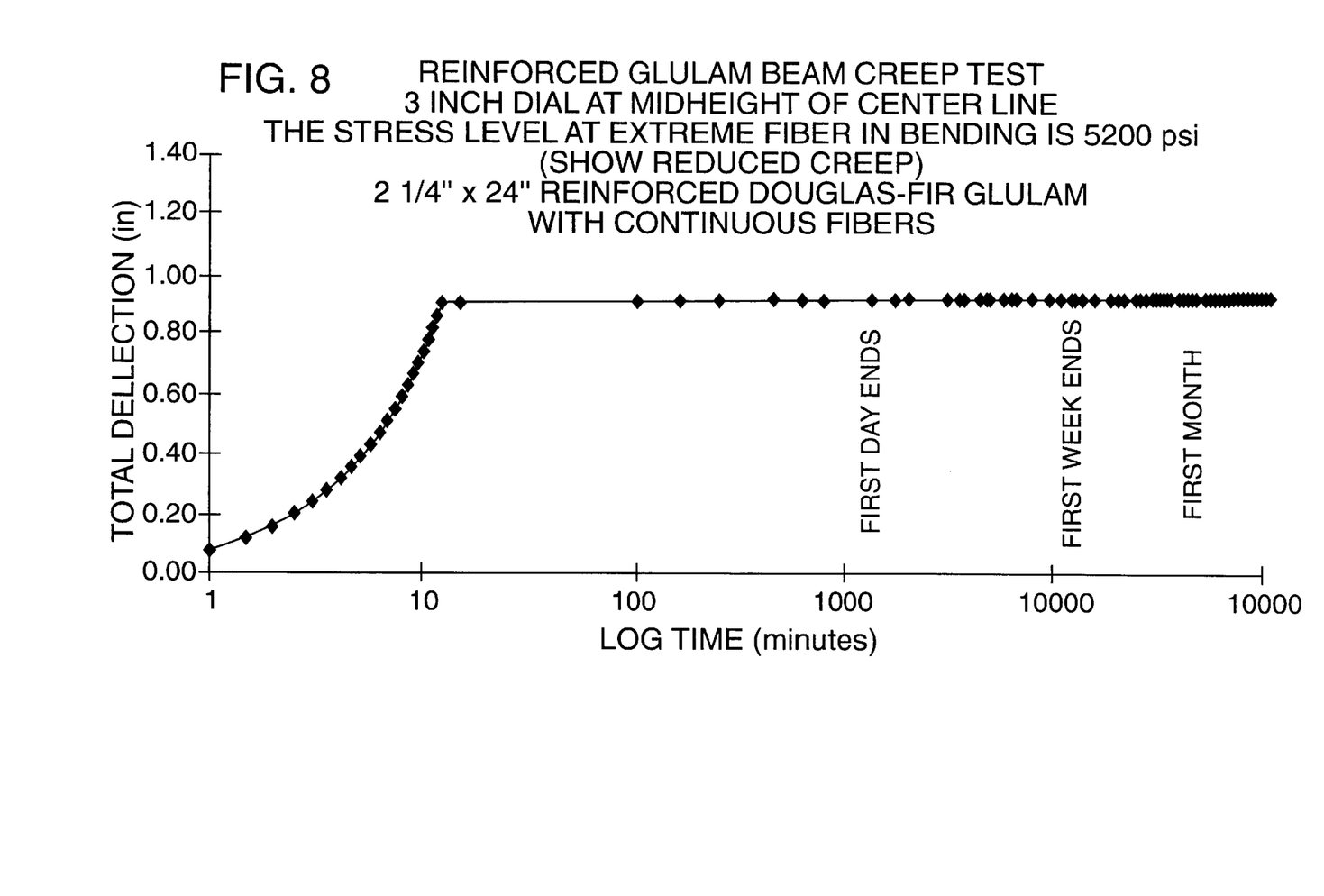
FIG. 8 is a diagram showing reduced creep in a reinforced gluelam having continuous fiber in the glueline in the tension zone.

FIG. 8 shows reduced creep in a reinforced glulam of the type shown in FIG. 7 with continuous fiber reinforcement in glueline in tension zone. (The beam tested to produce the results presented in FIG. 6 was 2.5" wide and 24" deep, whereas the beam shown in FIG. 5 was 5.125" wide and 12" deep.)

Figure 9A:
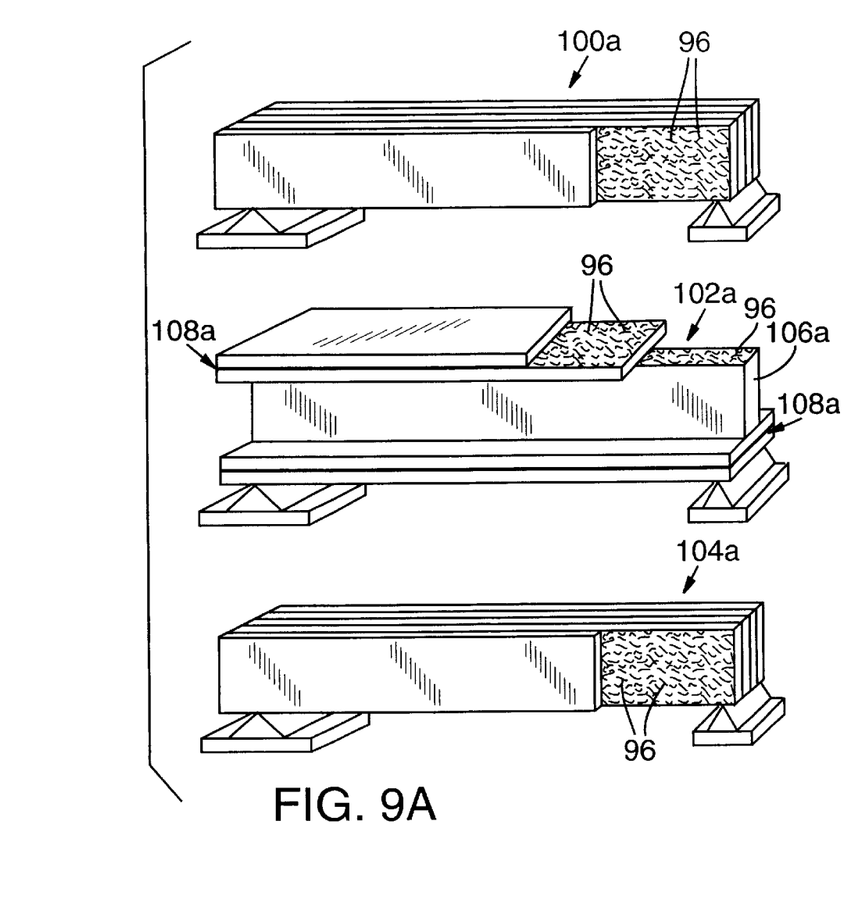
FIGS. 9A and 9B are perspective views of LVL, I-beam, and plywood structures with portions cut away to show, respectively, discontinuous and continuous fibers in the gluelines.
Figure 9B:
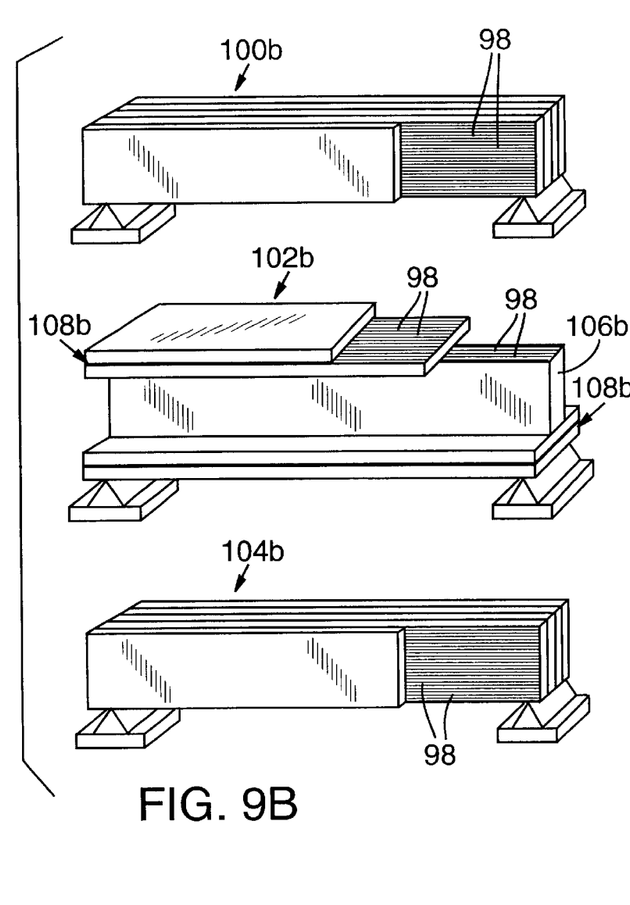

FIGS. 9A and 9B show cut away views of LVL, I-beam, and plywood products fabricated with, respectively, discontinuous fibers 96 and continuous fibers 98 in the gluelines. Reference numerals 100a and 100b indicate LVL; reference numerals 102a and 102b represent I-beams; and reference numerals 104a and 104b present plywood structures. I-beams 102a and 102b include solid sawn lumber components 106a and 106b and glued laminated components 108a and 108b.

It will be obvious to those having skill in the art that many changes may be made in the above-described details of the preferred embodiments of the present invention without departing from the underlying principles thereof. The scope of the invention should, therefore, be determined only by the following claims.

I claim:

1. A reconstituted wood member for bearing sag-inducing large applied loads over a span by controlling dimensional change, the reconstituted wood member comprising:
    a beam comprising opposed flange members connected by a web member, wherein at least one of the opposed flanges and web member is a wood member comprising reconstituted wood particles in the form of an integral structure held together by a resin binder throughout which multiple high strength discontinuous fibers of a poly(paraphenylene terephthalamide) (PPTA) polymer type are mixed, the high strength fibers being of between about 50 microns and 600 microns in microfibril length and populating the resin binder in amounts that are effective to control dimensional change in the beam.

2. The wood member of claim 1, wherein the multiple high strength discontinuous fibers are generally uniformly distributed throughout the resin binder.

3. The wood member of claim 1, wherein the multiple high strength discontinuous fibers have various lengths and are distributed in random orientation throughout the resin binder.

4. The wood member of claim 1 configured as a glue-laminated wood beam, a wood I-beam, a wood truss, laminated veneer, parallel strand lumber, oriented strand board, or reconstituted wood fiber members.

5. The wood member of claim 1 configured as hardboard; low, medium, or high density fiberboard; plywood; oriented strandboard; waferboard; or particleboard.

6. A reinforcement member for use as a component part in a wood structural member to bear sag-inducing applied loads, the reinforcement member comprising:

a reconstituted fiber product in the form of an integral structure, the reconstituted fiber product including reconstituted wood particles held together by a resin binder throughout which multiple discontinuous high strength fibers of a poly(paraphenylene terephthalamide) (PPTA) polymer type are mixed, the high strength fibers being of between about 50 microns and about 600 microns in microfibril length and populating the resin binder in amounts that are effective to control dimensional change in the reinforcement member and thereby in the wood structural member of which the reinforcement member is a component part.

7. The reinforcement member of claim 6, wherein the multiple discontinuous high strength fibers are generally uniformly mixed throughout the resin binder.

8. The reinforcement member of claim 6, wherein the multiple discontinuous high strength fibers have various lengths and are mixed in random orientation throughout the resin binder.

9. The reinforcement member of claim 6 configured as a glue-laminated wood beam, a wood I-beam, a wood truss, laminated veneer, or parallel strand lumber.

10. The reinforcement member of claim 6 configured as hardboard; low, medium, or high density fiberboard; plywood; oriented strandboard; waferboard; or particleboard.

* * * * *